United States Patent [19]

Wehnert et al.

[11] Patent Number: 4,545,837
[45] Date of Patent: Oct. 8, 1985

[54] MOLDED-IN COMPOSITE BUSHINGS

[75] Inventors: George J. Wehnert, Madison, Conn.; Stanley J. Richter, Long Island City, N.Y.

[73] Assignee: United Technologies Corporation, Hartford, Conn.

[21] Appl. No.: 692,455

[22] Filed: Jan. 18, 1985

Related U.S. Application Data

[62] Division of Ser. No. 499,699, May 31, 1983.

[51] Int. Cl.⁴ ............................................. B32B 31/14
[52] U.S. Cl. ................................. 156/191; 156/194; 156/253; 264/155; 264/248; 16/2; 384/297; 428/112; 428/137
[58] Field of Search ............... 428/107, 109, 111, 112, 428/137, 138, 120, 902; 16/2; 384/297, 298; 156/184, 191, 252, 194, 221, 253; 264/155, 273, 285, 248

[56] References Cited

U.S. PATENT DOCUMENTS 3,110,530  11/1963  Herman .............................. 384/298

Primary Examiner—Alexander S. Thomas
Attorney, Agent, or Firm—Alan C. Cohen

[57] ABSTRACT

This invention is directed toward a fiber reinforced resin matrix composite article having fiber reinforced resin matrix bushings. These bushings are formed by tightly wrapping the fibers to form a plug having the fiber orientation from about ±20° to about ±60° to the central axis around which the fibers are wrapped. The plug is then snugly inserted into a hole which has been cut in the composite article such that the central axis of the plug is perpendicular to the fibers in the composite article. The entire composite article containing the plug is then cured and the plug is then drilled out forming the bushing.

2 Claims, 5 Drawing Figures

FIG. 1
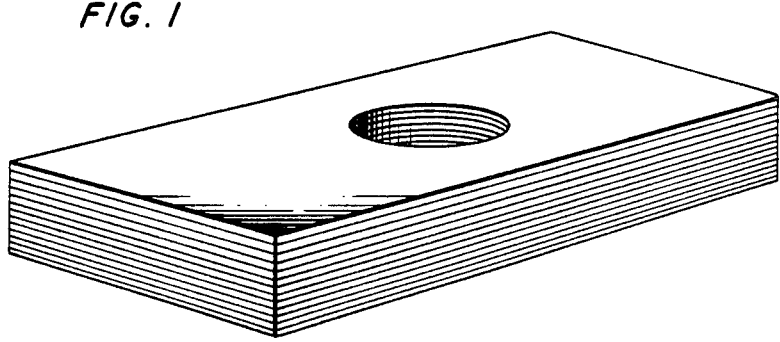
FIG. 2
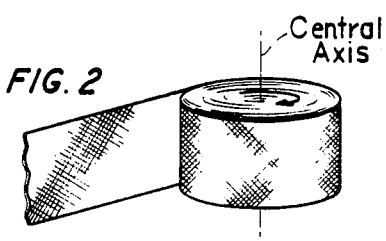
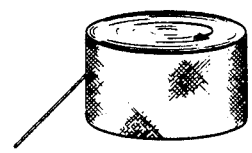
FIG. 3
FIG. 4
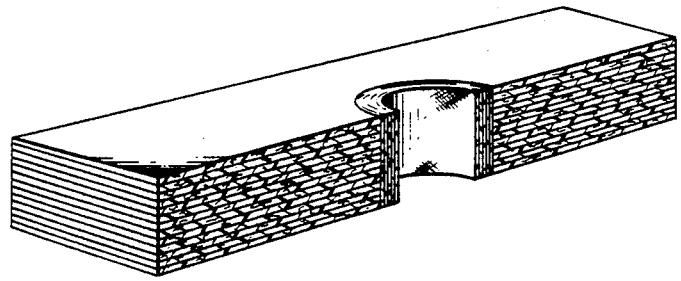
FIG. 5

MOLDED-IN COMPOSITE BUSHINGS

This is a division of application Ser. No. 499,699 filed on May 31, 1983.

DESCRIPTION

1. Technical Field

The field of art to which this invention pertains is composite materials, and particularly composite attachment means.

2. Background Art

Recently, there has been a tremendous surge in the interest in replacing traditional metal components with composite materials. There are a number of reasons why this is so, three of which are quite important.

First, composite components are considerably lighter than their metal counterparts. This particular feature is of particular interest to the automobile and aircraft industries where weight reduction means lower operating costs such as fuel savings.

Secondly, many of the metals which are being replaced are considered critical, especially if they are useful in aircraft. The critical definition is used to define a material which is in short supply or whose supply is dependent on foreign sources and for which there is not a readily available alternative. The particular issue of dependency was dramatically pointed out in the oil embargo of the early 1970's.

The third reason is that of integrity of the metal components or lack of damage tolerance. Metal has a tendency to develop cracks when it fatigues. There is no inherent way in which these cracks can be prevented from propagating, resulting in a complete failure of that component.

It has been shown that different combinations of fibers and matrixes, having preselected fiber orientation can be developed which go a long way to overcoming each one of the metal's shortcomings.

Recently, composites have been constructed which are so reliable that they can be used as damage tolerant components on aircraft, i.e. rotor hubs, and blades for helicopters.

However, there is a problem in using composite structures as component parts. The problem is how to effectively fasten or connect the composite components to the other components without weakening the composite components. A typical approach to connecting a composite component to something is to form the composite structure and then drill the required holes through the composite. A bolt, screw or other conventional attaching means is then passed through the hole of the composite structure and the adjoining structure. This technique is unsatisfactory for many applications because the area surrounding the hole is subject to galling and delamination from both the drilling process and the action of the screw, bolt or other fastening device. An alternate approach is to drill the hole on the cured composite and bond a protective metal bushing to line the hole to prevent galling. However, the use of the metal or any other secondarily bonded bushing, results in two drilling operations plus a bonding operation. The initial drilling of the composite would still result in the same delamination which occurred as before. In addition, it has proven difficult to bond the metal bushing so that the bond does not break when the bushing is drilled to the proper dimensions, resulting in the bushing spinning out of the hole, which can result in damage to the main structure.

Therefore, what is needed in this art is a simple procedure for fabricating composite components having holes which resist delamination and galling.

DISCLOSURE OF INVENTION

The invention is directed toward a method of making a composite article having at least one fiber reinforced resin matrix composite bushing.

The following commonly assigned U.S. patent applications are herein incorporated by reference, U.S. Ser. No. 477,696 entitled "A Fiber Reinforced/Epoxy Matrix Composite Helicopter Rotor Main Hub Plate"; U.S. Ser. No. 477,701 entitled "Fiber Reinforced/Epoxy Matrix Composite Helicopter Rotor Yoke"; U.S. Ser. No. 477,708 entitled "Composite Helicopter Rotor Hub"; and U.S. Ser. No. 477,709 entitled "Fiber Reinforced Epoxy Matrix Composite Helicopter Rotor Torque Tube" all filed on Mar. 22, 1983.

The method involves preparing each resin impregnated fiber containing layer of the composite article by cutting it to the proper article shape. These fiber layers may be of the raw fibers on which the resin is later applied or the fiber layer may be pre-impregnated with the resin matrix. Each layer has the holes, which are to form the connecting points, punched into it at the appropriate position. The requisite number of these layers are then stacked one on each other with the holes aligned, within the curing fixture. A plug of uncured resin impregnated fiber is then formed by tightly wrapping the resin impregnated fiber around a central axis such that the orientation of the fibers is about ±20° to about ±60° to this central axis (which would be oriented about ±70° to about ±30° to the fibers in the composite article). This plug, which is wound to the dimensions of the holes in the composite, is then fitted snugly inside the precut holes such that the central axis is perpendicular to the fiber orientation of the composite lay-up. The entire uncured composite article, along with the plugs, is then cured. The bushings are then formed by drilling holes to the proper dimensions in the plugs with conventional drilling equipment and techniques. It is critical that after the bushing has been formed, that the internal diameter of the bushing contain at least one layer of fibers which has an orientation of about ±20° to about ±60° to a vertical axis to the plane of composite fiber materials. It is this particular fiber orientation which prevents the delamination and galling of these bushings.

It has been found that during the curing cycle that the matrix and to some extent the fibers are meshed with the basic composite material forming a very positive mechanical lock between the bushing and the main composite article.

Another aspect of the invention is a fiber reinforced resin matrix bushing, wherein the orientation of the fibers in the bushing are about ±20° to about ±60° to the central axis of the bushing around which it is wound.

Other features and advantages of the present invention will become more apparent from the following detailed description of the preferred embodiment and accompanying drawings.

BRIEF DESCRIPTION OF THE DRAWINGS

FIG. 1 shows punched holes in uncured composite lay-up.

FIG. 2 shows preparation of a ±45° plug using woven prepreg.

FIG. 3 shows preparation of a ±45° plug using filament winding of prepreg.

FIG. 4 shows preparation of a plug having ±45° fibers internally and 90° fibers externally.

FIG. 5 shows cross section of a bushing in a cured composite article.

BEST MODE FOR CARRYING OUT THE INVENTION

During this discussion, it is assumed that someone skilled in the art knows and understands the common practices involved in preparing fiber reinforced resin matrix composites.

The present invention may be practiced with any fiber reinforced resin composite materials in which the fibers are capable of being tightly wound around a central axis. The fibers and the matrix used in forming the bushing may be the same as that which are used in the primary composite article, but need not be so limited. Any combination of fiber reinforcement and resin which is compatible with the primary composite materials may be used. The primary concerns in determining compatibility are, among other things, curing temperature of the matrix, chemical compatibility of the resin system matrix with the primary matrix as well as the physical properties of the bushing components, i.e. coefficient of thermal expansion, etc.

The primary composite article was formed using a combination of high strength graphite having typical properties such as 480 KSI tensile strength and nominal tensile modulus of $33 \times 10^6$ PSI interleaved with S-type fiberglass cloth, the fiber orientation being unidirectional. Each layer was cut into a 6 in. × 6 in. square and two 1 in. holes were punched into it. The layers were then stacked upon each other in the curing fixture to form the primary lay-up as shown in FIG. 1. Plugs of just high strength graphite fiber/resin matrix were formed by winding the pre-impregnated graphite cloth tightly upon itself. The cloth was wound such that the fiber orientation was about ±45° to a central axis around which the cloth was wrapped, FIG. 2. The winding continued until each plug was 1 inch in diameter. This required 36 wraps of the cloth. The plugs were then inserted into the precut holes in the composite lay-up and the entire article was cured at 325° F. for two hours.

After the article had cured, it was removed from the fixture and the plugs were drilled out using a conventional 0.5 in. drill to form the bushings, FIG. 5.

Other techniques may be used to form the plug such as winding a tow of fibers around the central axis as in FIG. 3. A small, removable mandrel should be used to start the winding.

An alternate configuration of these composite bushings is to prepare the plug as described and then wrap at least one layer of the resin impregnated fiber around the external diameter of the plug such that its fiber orientation is about 90° to the central axis of the bushing, FIG. 4. This 90° layer allows for less disruption of the fiber orientation at the interface of the plug and the primary composite article. It should be understood that this is an additional layer and not a replacement for the ±20° to ±60° oriented fibers.

Although the orientation of the fibers has been disclosed as 45° with an optional 90° outer wrap, this technique may be practiced with other orientations as well. However, the internal wraps forming the bushing should be limited to about ±20° to about ±60° in order to prevent delamination from occurring.

Bushings made using this method have excellent stability as they are totally integrated into the composite article. They are easy to form and eliminate a number of operational steps required in implanting bushings using other techniques. These integrated composite bushings form a very positive mechanical lock between the bushing and the composite article having a high resistance to galling and delaminating due to the action of the connecting unit.

It should be understood that the invention is not limited to the particular embodiments shown and described herein, but that various changes and modifications may be made without departing from the spirit and scope of this novel concept as defined by the following claims.

We claim:

1. A method of making a fiber reinforced resin matrix composite article having a fiber reinforced resin matrix bushing comprising:
    preparing an uncured, resin impregnated fiber reinforced composite article having at least one connecting hole formed therein,
    tightly wrapping uncured resin impregnated fibers around a central axis forming a plug, until the diameter of the plug is substantially the same as that of the formed hole in the uncured composite article,
    the plug is then inserted into the formed hole of the composite such that the central axis around which the plug is wrapped is substantially perpendicular to the composite article fiber orientation,
    the composite article containing the plug is then cured, and an attachment hole of the proper dimensions is then drilled into the plug forming the bushing, said bushing having at least one layer of fibers which are oriented about ±20° to about ±60° to the central axis of the bushing.

2. The method of claim 1 wherein the wrapping of the plug includes wrapping at least one outer layer of fibers oriented about 90° to the central axis onto the about ±20° to about ±60° oriented fibers.

* * * * *